US012542287B2

(12) United States Patent
Miftakhov et al.

(10) Patent No.: US 12,542,287 B2
(45) Date of Patent: Feb. 3, 2026

(54) FUEL TANK HEAT DISSIPATION SYSTEM FOR FUEL CELL COOLING

(71) Applicant: ZeroAvia, Inc., Hollister, CA (US)

(72) Inventors: Valery Miftakhov, San Carlos, CA (US); Bob Lee Mackey, San Jose, CA (US)

(73) Assignee: ZeroAvia, Inc., Hollister, CA (US)

( * ) Notice: Subject to any disclaimer, the term of this patent is extended or adjusted under 35 U.S.C. 154(b) by 805 days.

(21) Appl. No.: 17/870,657

(22) Filed: Jul. 21, 2022

(65) Prior Publication Data

US 2023/0028037 A1    Jan. 26, 2023

Related U.S. Application Data

(63) Continuation-in-part of application No. 17/669,327, filed on Feb. 10, 2022, now abandoned, which is a
(Continued)

(51) Int. Cl.
| | |
|---|---|
| *H01M 8/04029* | (2016.01) |
| *H01M 8/04007* | (2016.01) |
| *H01M 8/04701* | (2016.01) |

(52) U.S. Cl.
CPC ... *H01M 8/04029* (2013.01); *H01M 8/04074* (2013.01); *H01M 8/04731* (2013.01)

(58) Field of Classification Search
CPC ............ F05D 2220/76; F05D 2260/20; F05D 2260/201; F05D 2260/203; F02K 5/00;
(Continued)

(56) References Cited

U.S. PATENT DOCUMENTS

| | | |
|---|---|---|
| 3,801,372 A | 4/1974 | Shaw |
| 5,106,035 A | 4/1992 | Langford |
| | (Continued) | |

FOREIGN PATENT DOCUMENTS

| | | |
|---|---|---|
| CN | 201048143 Y | 4/2008 |
| DE | 19821952 A1 | 11/1999 |
| | (Continued) | |

OTHER PUBLICATIONS

DE102016203466a1, Schulze, et al. "Cooling system for a fuel cell stack with sensing a coolant level in a surge tank by means of an electrical conductivity value", machine English translation retrieved from https://worldwide.espacenet.com/ Date: May 13, 2025 (Year: 2017).*

(Continued)

*Primary Examiner* — Matthew T Martin
*Assistant Examiner* — Jared Hansen
(74) *Attorney, Agent, or Firm* — Osha Bergman Watanabe & Burton LLP

(57) ABSTRACT

A fuel tank heat dissipation system for fuel cell (FC) cooling is disclosed. In one example, at least one FC is in thermal communication with an intermediary heat exchanger. A fuel tank is also in fluid communication with the intermediary heat exchanger. A fluid is used to receive heat from the intermediary heat exchanger and flow along a first fluid path to the fuel tank. A nozzle is used to spray the fluid about an interior surface of the fuel tank, where the spray of the fluid about the interior of the fuel tank allows the fluid to dissipate the heat. A second fluid path from the fuel tank to the intermediary heat exchanger, the second fluid path to return the fluid that has dissipated the heat to the intermediary heat exchanger.

17 Claims, 7 Drawing Sheets

Related U.S. Application Data continuation-in-part of application No. 16/950,735, filed on Nov. 17, 2020, now Pat. No. 12,341,225.

(60) Provisional application No. 63/148,310, filed on Feb. 11, 2021, provisional application No. 63/148,317, filed on Feb. 11, 2021, provisional application No. 63/148,205, filed on Feb. 11, 2021, provisional application No. 63/076,382, filed on Sep. 10, 2020, provisional application No. 62/936,627, filed on Nov. 18, 2019, provisional application No. 62/936,626, filed on Nov. 18, 2019, provisional application No. 62/936,623, filed on Nov. 18, 2019, provisional application No. 62/936,625, filed on Nov. 18, 2019, provisional application No. 62/936,621, filed on Nov. 18, 2019, provisional application No. 62/936,622, filed on Nov. 18, 2019, provisional application No. 62/936,506, filed on Nov. 17, 2019, provisional application No. 62/936,510, filed on Nov. 17, 2019, provisional application No. 62/936,513, filed on Nov. 17, 2019, provisional application No. 62/936,514, filed on Nov. 17, 2019, provisional application No. 62/936,505, filed on Nov. 17, 2019, provisional application No. 62/936,508, filed on Nov. 17, 2019, provisional application No. 62/936,511, filed on Nov. 17, 2019.

(58) Field of Classification Search
CPC ......... H01M 8/04029; H01M 8/04074; H01M 8/04208; H01M 8/04731; H01M 2250/20; Y02E 60/50; Y02T 90/40
See application file for complete search history.

(56) References Cited

U.S. PATENT DOCUMENTS

| | | | |
|---|---|---|---|
| 5,810,284 A | 9/1998 | Hibbs et al. | |
| 6,119,979 A | 9/2000 | Lee et al. | |
| 6,322,915 B1 | 11/2001 | Collins et al. | |
| 6,380,637 B1 | 4/2002 | Hsu et al. | |
| 6,568,633 B2 | 5/2003 | Dunn | |
| 6,733,910 B1* | 5/2004 | Kralick | H01M 8/04029 429/434 |
| 2001/0018138 A1 | 8/2001 | Iwase | |
| 2002/0005454 A1 | 1/2002 | MacCready et al. | |
| 2003/0096148 A1 | 5/2003 | Edwards | |
| 2004/0043267 A1 | 3/2004 | Schuler et al. | |
| 2004/0228055 A1 | 11/2004 | Pearson | |
| 2006/0093883 A1 | 5/2006 | Pristash | |
| 2007/0000016 A1* | 1/2007 | Handa | B60K 15/00 2/158 |
| 2007/0160887 A1 | 7/2007 | Eickhoff | |
| 2007/0254200 A1 | 11/2007 | Takada et al. | |
| 2008/0145716 A1 | 6/2008 | Yu et al. | |
| 2009/0212634 A1 | 8/2009 | Kojima et al. | |
| 2009/0293494 A1 | 12/2009 | Hoffjann et al. | |
| 2010/0261079 A1 | 10/2010 | Kells et al. | |
| 2010/0293959 A1 | 11/2010 | Remy et al. | |
| 2012/0189875 A1 | 7/2012 | Fischel et al. | |
| 2012/0286522 A1* | 11/2012 | Stahlkopf | F04B 49/22 290/1 R |
| 2014/0047814 A1 | 2/2014 | Steinwandel et al. | |
| 2015/0357658 A1 | 12/2015 | Kashyap et al. | |
| 2016/0181641 A1 | 6/2016 | Hoffjann et al. | |
| 2017/0175565 A1 | 6/2017 | Sennoun | |
| 2017/0211474 A1 | 7/2017 | Sennoun | |
| 2017/0256804 A1* | 9/2017 | Miller | H01M 8/04753 |
| 2018/0053950 A1 | 2/2018 | Buehler et al. | |
| 2018/0304753 A1 | 10/2018 | Vondrell et al. | |
| 2021/0043961 A1 | 2/2021 | Itou et al. | |
| 2021/0151783 A1 | 5/2021 | Miftakhov | |
| 2021/0155476 A1 | 5/2021 | Futerman et al. | |
| 2022/0325666 A1 | 10/2022 | Miftakhov et al. | |
| 2023/0352936 A1 | 11/2023 | Miftakhov | |

FOREIGN PATENT DOCUMENTS

| | | | | |
|---|---|---|---|---|
| DE | 102016203466 A1 * | 9/2017 | .......... | G01F 23/241 |
| EP | 2878795 A1 | 6/2015 | | |
| EP | 3199791 A1 | 8/2017 | | |
| EP | 4196675 A1 | 6/2023 | | |
| JP | H11200888 A | 7/1999 | | |
| JP | 2019-117792 A | 7/2019 | | |
| KR | 20200064492 A | 6/2020 | | |
| WO | 2022056107 A1 | 3/2022 | | |
| WO | 2024020421 A1 | 1/2024 | | |

OTHER PUBLICATIONS

Thomas, et al., "Fuel Cells—Green Power", https://paginas.fe.up.pt/~mcnunes/QAE/documentos/fuelcells.pdf, Nov. 29, 2007, 1-36.
Extended European Search Report for Application No. 20208430.7 dated Apr. 13, 2021.
ISA/EP, Search Report for International Application No. PCT/US21/49635, 11 pages, Dec. 3, 2021.
Fernandes, et al., "SOFC-APU systems for aircraft: A review", International Journal of Hydrogen Energy 43.33, 2018, 16311-16333.
General Electric Aviation, "The Single-Spool Core: A proven design for performance and simplicity", t901-white-paper.pdf, retrieved Jun. 15, 2022 https://web.archive.org/web/20170630095803/https://www.geaviation.com/sites/default/files/single-vs-dual-spool .pdf.
Ji, et al., "Comparative performance analysis of solid oxide fuel cell turbine-less jet engines for electric propulsion airplanes: Application of alternative fuel", Aerospace Science and Technology, Elsevier Masson, FR, vol. 93, Jul. 10, 2019.
Ji, et al., "Thermodynamic analysis of a solid oxide fuel cell jet hybrid engine for long-endurance unmanned air vehicles", Energy Conversion and Management 183, 2019, 50-64.
Petrescu, et al., "Modern propulsions for aerospace—a review", Journal of Aircraft and Spacecraft Technology 1.1, 2017.
Office Action issued in related U.S. Appl. No. 16/950,735 dated Jun. 20, 2024 (29 pages).
Hendrick, Patrick, et al. "Air-hydrogen heat exchangers for advanced space launchers." Journal of propulsion and power 25.6 (2009): 1211-1219 (9 pages).
Alhazmi, Nahla Eid. Thermal conductivity of proton exchange membrane fuel cell components. University of Leeds, 2014 (261 pages).
ISA/EP, International Search Report and Written Opinion for International Application No. PCT/US2023/070460, 9 pages, Oct. 19, 2023.
Song, et al., "Performance analysis of a tubular solid oxide fuel cell/micro gas turbine hybrid power system based on a quasi-two dimensional model.", Journal of Power Sources 142, 2005, 30-42.
Office Action issued in related U.S. Appl. No. 17/669,327 dated Nov. 4, 2024 (37 pages).

* cited by examiner

FUEL TANK HEAT DISSIPATION SYSTEM FOR FUEL CELL COOLING

CROSS REFERENCE TO RELATED APPLICATIONS

This application is claims priority to and is a Continuation-in-part of U.S. patent application Ser. No. 17/669,327, filed on Feb. 10, 2022, entitled "USE COWLING AND OTHER SURFACES WITH LARGE AIRFLOWS AS HEAT DISSIPATION DEVICES FOR FC COOLING" by Miftakhov et al, assigned to the assignee of the present application, the disclosure of which is herein incorporated by reference in its entirety.

The application Ser. No. 17/669,327 is a Continuation-in-part and claims priority to and the benefit of U.S. application Ser. No. 16/950,735 which claims the benefit of U.S. Provisional Application Ser. No. 62/936,505, filed Nov. 17, 2019, U.S. Provisional Application Ser. No. 62/936,506, filed Nov. 17, 2019, U.S. Provisional Application Ser. No. 62/936,507, filed Nov. 17, 2019, U.S. Provisional Application Ser. No. 62/936,508, filed Nov. 17, 2019, U.S. Provisional Application Ser. No. 62/936,510, filed Nov. 17, 2019, U.S. Provisional Application Ser. No. 62/936,511, filed Nov. 17, 2019, U.S. Provisional Application Ser. No. 62/936,513, filed Nov. 17, 2019, U.S. Provisional Application Ser. No. 62/936,514, filed Nov. 17, 2019, U.S. Provisional Application Ser. No. 62/936,621, filed Nov. 18, 2019, U.S. Provisional Application Ser. No. 62/936,622, filed Nov. 18, 2019, U.S. Provisional Application Ser. No. 62/936,623, filed Nov. 18, 2019, U.S. Provisional Application Ser. No. 62/936,625, filed Nov. 18, 2019, U.S. Provisional Application Ser. No. 62/936,626, filed Nov. 18, 2019, U.S. Provisional Application Ser. No. 62/936,627, filed Nov. 18, 2019, and U.S. Provisional Application Ser. No. 63/076,382, filed Sep. 10, 2020, the entire contents of each of which are incorporated by reference herein.

The application Ser. No. 17/669,327 also claims priority to and the benefit of U.S. Provisional Application Ser. No. 63/148,205, filed Feb. 11, 2021, U.S. Provisional Application Ser. No. 63/148,310, filed Feb. 11, 2021, and U.S. Provisional Application Ser. No. 63/148,317, filed Feb. 11, 2021, the entire contents of each of which are incorporated by reference herein.

TECHNICAL FIELD

This disclosure relates to clean energy-based air propulsion systems, and more particularly, to integrated hydrogen-electric engines such as for aircraft transportation systems.

BACKGROUND

In the commercial aviation market, the high maintenance and fuel costs for the traditional turbine engines drive operating costs for the airlines and other types of operators. Additionally, the continued growth of fossil fuel aviation is increasingly contributing to the particulate pollution around the airports, increased reliance on fossil fuel extraction, as well as growing climate change impact. The highspeed exhaust gases of the traditional turbine engines contribute significantly to the extremely large noise footprint of the commercial aviation, especially in the densely populated areas.

In the surveillance and defense applications, the high engine and exhaust temperatures significantly hamper the ability of aircraft to avoid detection and therefore reduce the mission capabilities of the aircraft.

Companies have attempted to develop zero emissions aircraft using electric motors powered by hydrogen fuel cells, however the rejection of low grade waste heat remains a significant challenge because existing heat exchangers sized to reject low grade waste heat cause excessive drag.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

For purposes of promoting an understanding of the principles of this disclosure, reference will now be made to exemplary embodiments illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Figure 1:
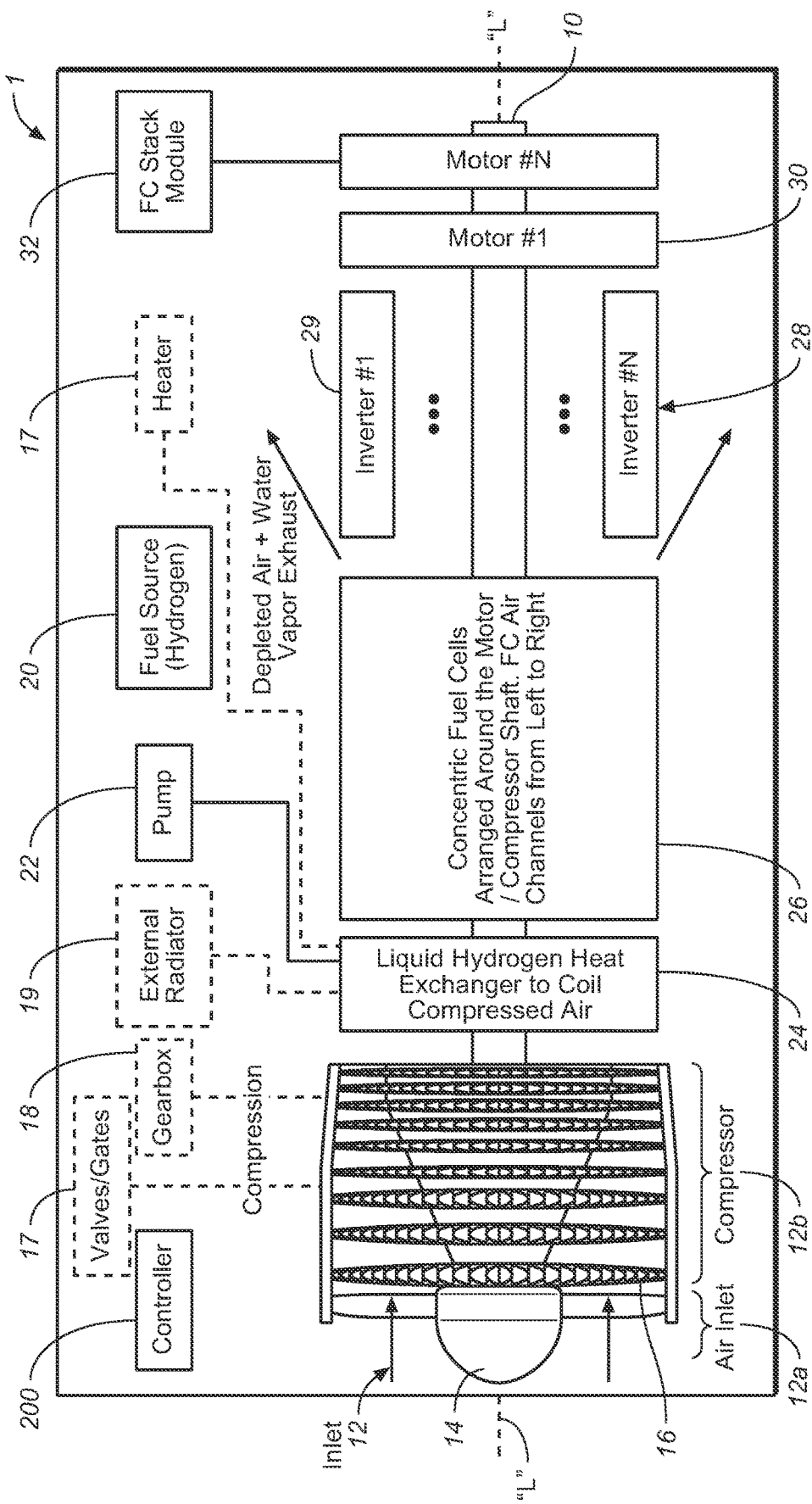
FIG. 1 is a schematic view of an integrated hydrogen-electric engine system, in accordance with an embodiment.

FIG. 1 illustrates integrated hydrogen-electric engine system 1 that can be utilized, for example, in a turboprop or turbofan system, to provide a streamlined, light weight, power dense and efficient system shown in accordance with an embodiment. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 26 in fluid communication with heat exchanger 24, and a motor assembly 28 disposed in electrical communication with fuel cell stack 26.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of air flow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 26 for conversion to electrical energy. As can be appreciated, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 17 to regulate the pressure and flow of the air that enters the downstream fuel cell, as well as to manage the cold air supply to any auxiliary heat exchangers in the system.

Compressor 12 can optionally be mechanically coupled with elongated shaft 10 via a gearbox 18 to change (increase and/or decrease) compressor turbine rotations per minute (RPM) and to change the air flow to fuel cell stack 26. For instance, gearbox 18 can be configured to enable the air flow, or portions thereof, to be exhausted for controlling a rate of air flow through the fuel cell stack 26, and thus, the output power.

Integrated hydrogen-electric engine system 1 further includes a gas management system such as a heat exchanger 24 disposed concentrically about elongated shaft 24 and configured to control thermal and/or humidity characteristics of the compressed air from air compressor system 12 for conditioning the compressed air before entering fuel cell stack 26. Integrated hydrogen-electric engine system 1 further also includes a fuel source 20 of fuel cryogenic (e.g., liquid hydrogen—LH2, or cold hydrogen gas) that is operatively coupled with heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system. The hydrogen gas then get heated in the heat exchanger 24 to a working temperature of the fuel cell 26 which also takes heat out of the compressed air, which results in a control of flow through the heat exchanger 24. In embodiments, a heater 17 can be coupled with or included with heat exchanger 24 to increase heat as necessary, for instance, when running under a low power regime. Additionally, and/or alternatively, motor assembly 28 can be coupled with heat exchanger 24 for looping in the cooling/heating loops from motor assembly 28 as necessary. Such heating/cooling control can be managed, for instance, via controller 200 of integrated hydrogen-electric engine system 1. In embodiments, fuel source 20 can be disposed in fluid communication with motor assembly 28 or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen.

Figure 2:
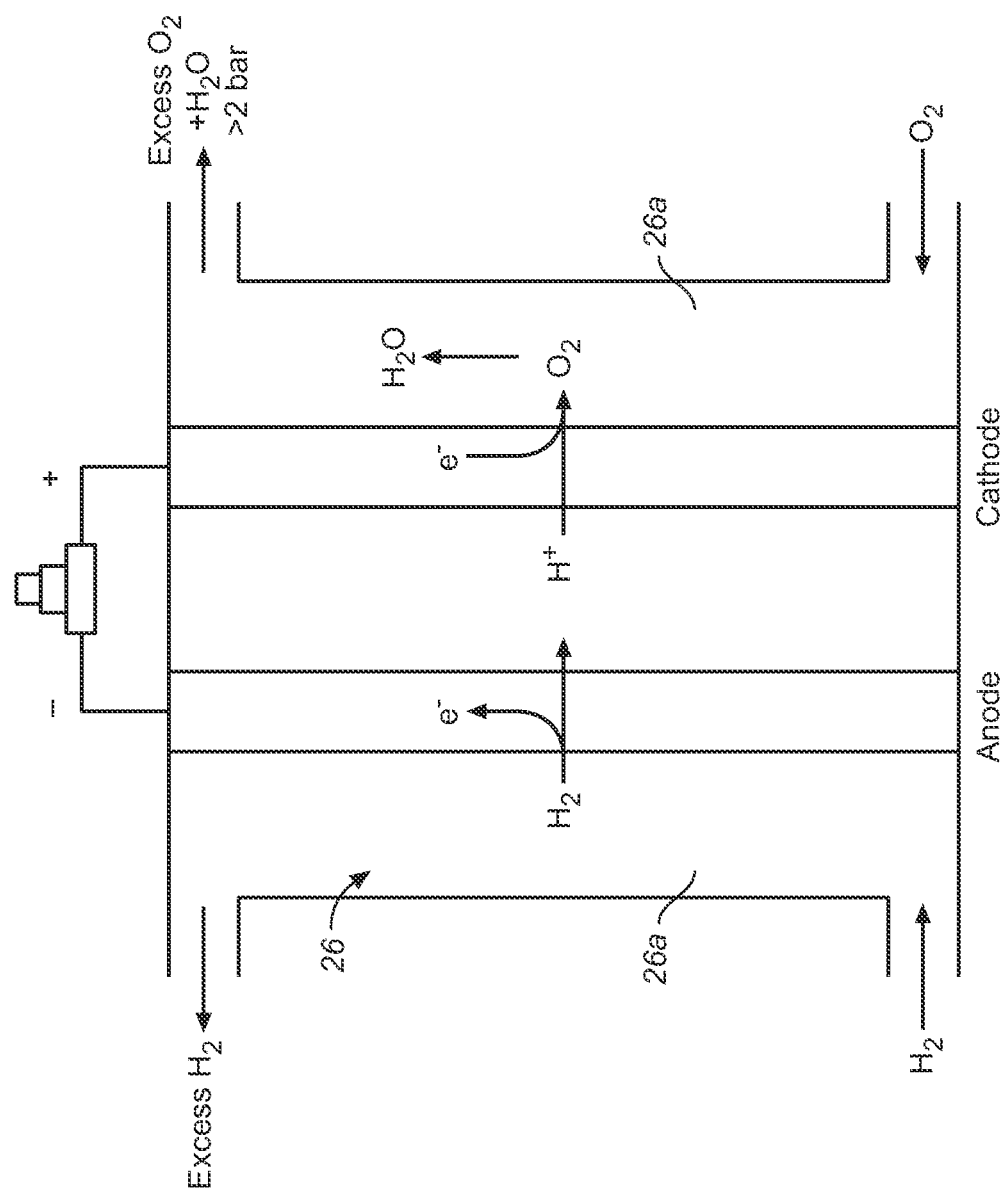
FIG. 2 is a schematic view of a fuel cell of the integrated hydrogen-electric engine system of FIG. 1, in accordance with an embodiment.

With reference also to FIG. 2, integrated hydrogen-electric engine system 1 further includes an energy core in the form of a fuel cell stack 26, which may be circular, and is also coaxially supported on elongated shaft 10 (e.g., concentric) such that air channels 26a of fuel cell stack 26 may be oriented in parallel relation with elongated shaft 10 (e.g., horizontally or left-to-right). Fuel cell stack 26 may be in the form of a proton-exchange membrane fuel cell (PEMFC). The fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26. The electrical energy generated from fuel cell stack 26 is then transmitted to motor assembly 28, which is also coaxially/concentrically supported on elongated shaft 10. In one embodiment, integrated hydrogen-electric engine system 1 may include any number of external radiators 19 (FIG. 1) for facilitating air flow and adding, for instance, additional cooling. Notably, fuel cell stack 26 can include liquid cooled and/or air cooled cell types that so that cooling loads are integrated into heat exchanger 24 for reducing total amount of external radiators needed in the system.

Motor assembly 28 of integrated hydrogen-electric engine system 1 includes a plurality of inverters 29 configured to convert the direct current to alternating current for actuating one or more of a plurality of motors 30 in electrical communication with the inverters 29. The plurality of motors 30 are configured to drive (e.g., rotate) the elongated shaft 10 in response to the electrical energy received from fuel cell stack 26 for operating the components on the elongated shaft 10 as elongated shaft 10 rotates.

In one embodiment, one or more of the inverters 29 may be disposed between motors 30 (e.g., a pair of motors) to form a motor subassembly, although any suitable arrangement of motors 30 and inverters 29 may be provided. The motor assembly 28 can include any number of motor subassemblies supported on elongated shaft 10 for redundancy and/or safety. Motor assembly 28 can include any number of fuel cell stack modules 32 configured to match the power of the motors 30 and the inverters 29 of the subassemblies. In this regard, for example, during service, the modules 32 can be swapped in/out. Each module 32 can provide any power, such as 400 kw or any other suitable amount of power, such that when stacked together (e.g., 4 or 5 modules), total power can be about 2 Megawatts on the elongated shaft 10. In embodiments, motors 30 and inverters 29 can be coupled together and positioned to share the same thermal interface so a motor casing of the motors 30 is also an inverter heat sink so only a single cooling loop goes through motor assembly 28 for cooling the inverters 29 and the motors 30 at the same time. This reduces the number of cooling loops and therefore the complexity of the system.

Integrated hydrogen-electric engine system 1 further includes a controller 200 (e.g., a full authority digital engine (or electronics) control (e.g., a FADEC) for controlling the various embodiments of the integrated hydrogen-electric engine system 1 and/or other components of aircraft system. For instance, controller 200 can be configured to manage a flow of liquid hydrogen, manage coolant liquids from the motor assembly 28, manage, for example, any dependent auxiliary heater for the liquid hydrogen, manage rates of hydrogen going into fuel cell stack 26, manage rates of heated/cooled compressed air, and/or various flows and/or power of integrated hydrogen-electric engine system 1. The algorithm for managing these thermal management components can be designed to ensure the most efficient use of the various cooling and heating capacities of the respective gases and liquids to maximize the efficiency of the system and minimize the volume and weight of same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
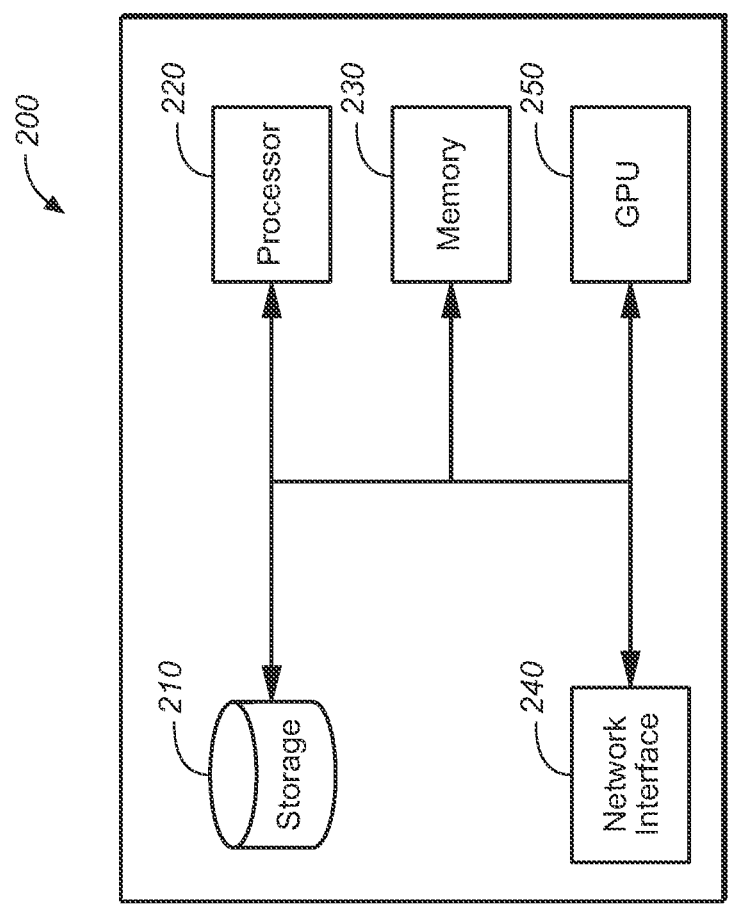
FIG. 3 is a block diagram of a controller configured for use with integrated hydrogen-electric engine system of FIG. 1, in accordance with an embodiment.

FIG. 3 illustrates that controller 200 includes a processor 220 connected to a computer-readable storage medium or a memory 230 shown in accordance with an embodiment. The computer-readable storage medium or memory 230 may be a volatile type memory, e.g., RAM, or a non-volatile type memory, e.g., flash media, disk media, etc. In one embodiment, the processor 220 may be another type of processor such as, without limitation, a digital signal processor, a microprocessor, an ASIC, a graphics processing unit (GPU), a field-programmable gate array (FPGA), or a central processing unit (CPU). In one embodiment, network inference may also be accomplished in systems that have weights implemented as memristors, chemically, or other inference calculations, as opposed to processors.

In one embodiment, the memory 230 can be random access memory, read-only memory, magnetic disk memory, solid-state memory, optical disc memory, and/or another type of memory. In one embodiment, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In one embodiment, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive among other data, the fuel supply status, aircraft location, and control, among other features, the pumps, motors, sensors, etc.

Further, as can be appreciated, the integrated hydrogen-electric engine system 1 can include any number and/or type of sensors, electrical components, and/or telemetry devices that are operatively coupled with controller 200 for facilitating the control, operation, and/or input/out of the various components of integrated hydrogen-electric engine system 1 for improving efficiencies and/or determining errors and/or failures of the various components.

It should be understood that the disclosed structure can include any suitable mechanical, electrical, and/or chemical components for operating the disclosed system or components thereof. For instance, such electrical components can include, for example, any suitable electrical and/or electro-mechanical, and/or electrochemical circuitry, which may include or be coupled with one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" is used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloud-computing-based storage. In one embodiment, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IOT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller may include or be coupled with a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled with a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In one embodiment, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing one embodiment and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Pipes with coolant run along aircraft surfaces to take advantage of the incoming airflow for cooling purposes. The heat can be also used for de-icing of the surfaces, such as wings and tail stabilizers during flight. Can be used also for cockpit heat and heating of various A/C sensors.

Figure 4:
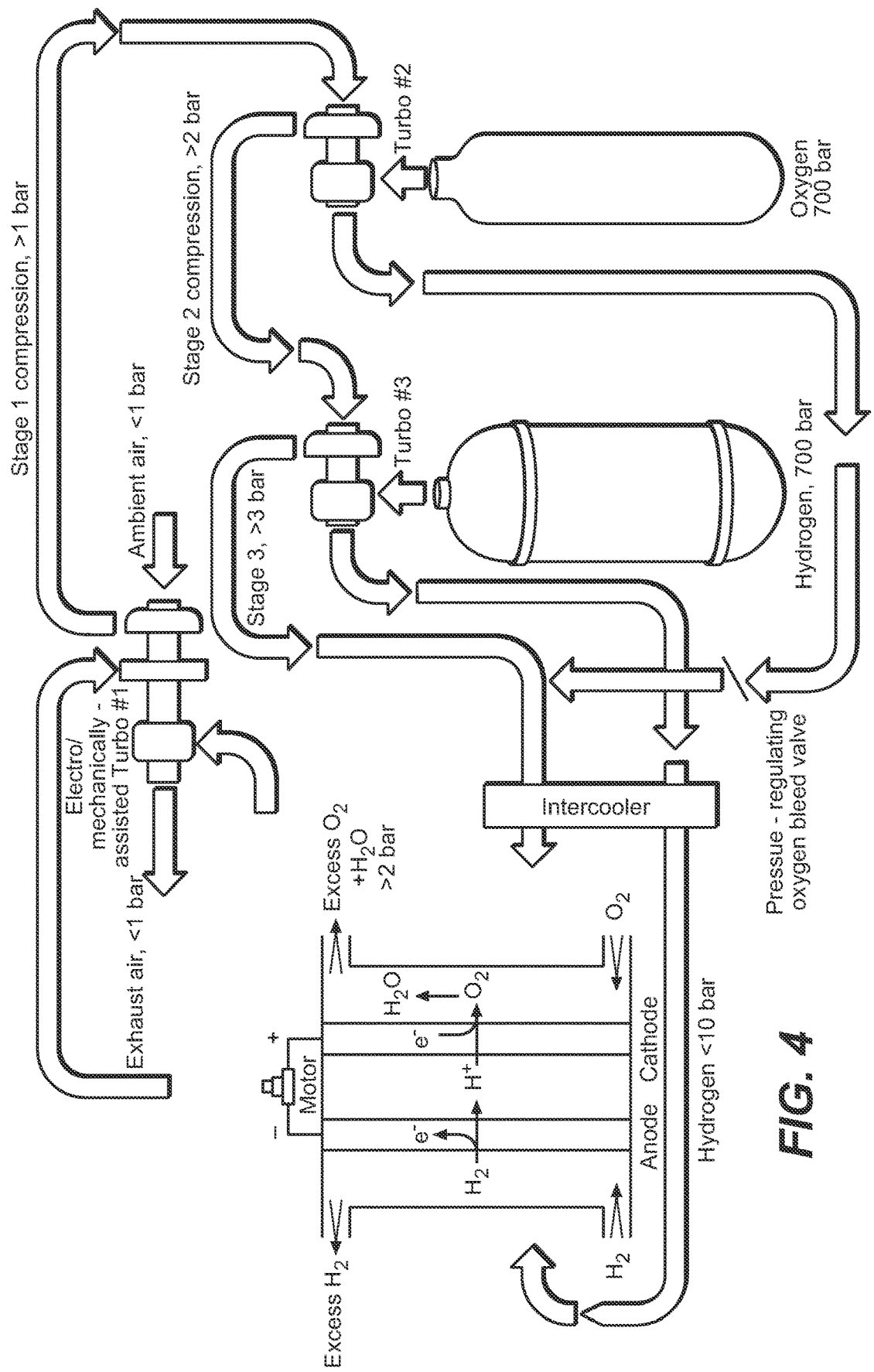
FIG. 4 shows how to use the power of compressed gasses used in fuel cell (FC) to spin the air intake compressor for FC, in accordance with an embodiment.

In FIG. 4 the idea is to use the power of compressed gasses used in FC to spin the air intake compressor for FC. The FC air compressor is composed of 3 stages. First compressor stage is electrically driven, second stage is driven by compressed H2 and third stage is driven by compressed O2 or compressed air. H2 and O2 are at 700 bar, while FC intake is at 3 bar and this energy is usually wasted. The invention turns this energy of compressed gases into mechanical energy that can be used to drive the air intake compressor for FC.

Invention uses phase change materials (ice, paraffin, etc.) that require high amount of energy for the phase change to buffer the heat output of the FC, such as during the takeoff.

One implementation is to insert a high-surface-area enclosure filled with paraffin into the coolant loop of the FC. If the phase transition temperature of the working substance (paraffin) is chosen in the operating range of the FC, a large amount of energy can be removed from the fuel cell by melting the substance during the high-power operation when the main cooling system does not have enough capacity to remove all the heat at the required rate.

Fuel Tank Heat Dissipation System

As described herein, during operation the FC 26 generates low-grade waste heat. For example, a LTPEM FC may operate at no more than 80° C., which may be only 50° C. over ambient in common conditions for takeoff. This low-grade heat waste needs to be removed/resolved to maintain the proper operation of the FC 26. In one embodiment, a large volume of airflow over heat exchangers is used to provide the cooling, with volume of airflow required proportional to drag. Prior to the embodiments described herein, the volume of airflow over the heat exchangers would cause excessive drag.

In one embodiment, after conversion to FC-electric motor powerplants, an aircraft's fuel tank(s) are empty and no longer need to be used to carry fuel. Embodiments described herein repurpose the fuel tank(s) to act as heat exchangers. By repurposing the fuel tank(s), as disclosed herein, embodiments provide a new and novel way of resolving the low-grade waste heat without incurring any additional drag.

In the following discussion, it should be appreciated that in one embodiment, the fuel tank 506 heat dissipation system for FC cooling (shown in FIGS. 5-7) may be used in addition to one or more of the cooling features described in FIG. 1-4. It should further be appreciated that in one embodiment, the fuel tank 506 heat dissipation system for FC cooling (shown in FIGS. 5-7) may be used in place of one, some, or all of the cooling features described in FIG. 1-4.

Figure 5:
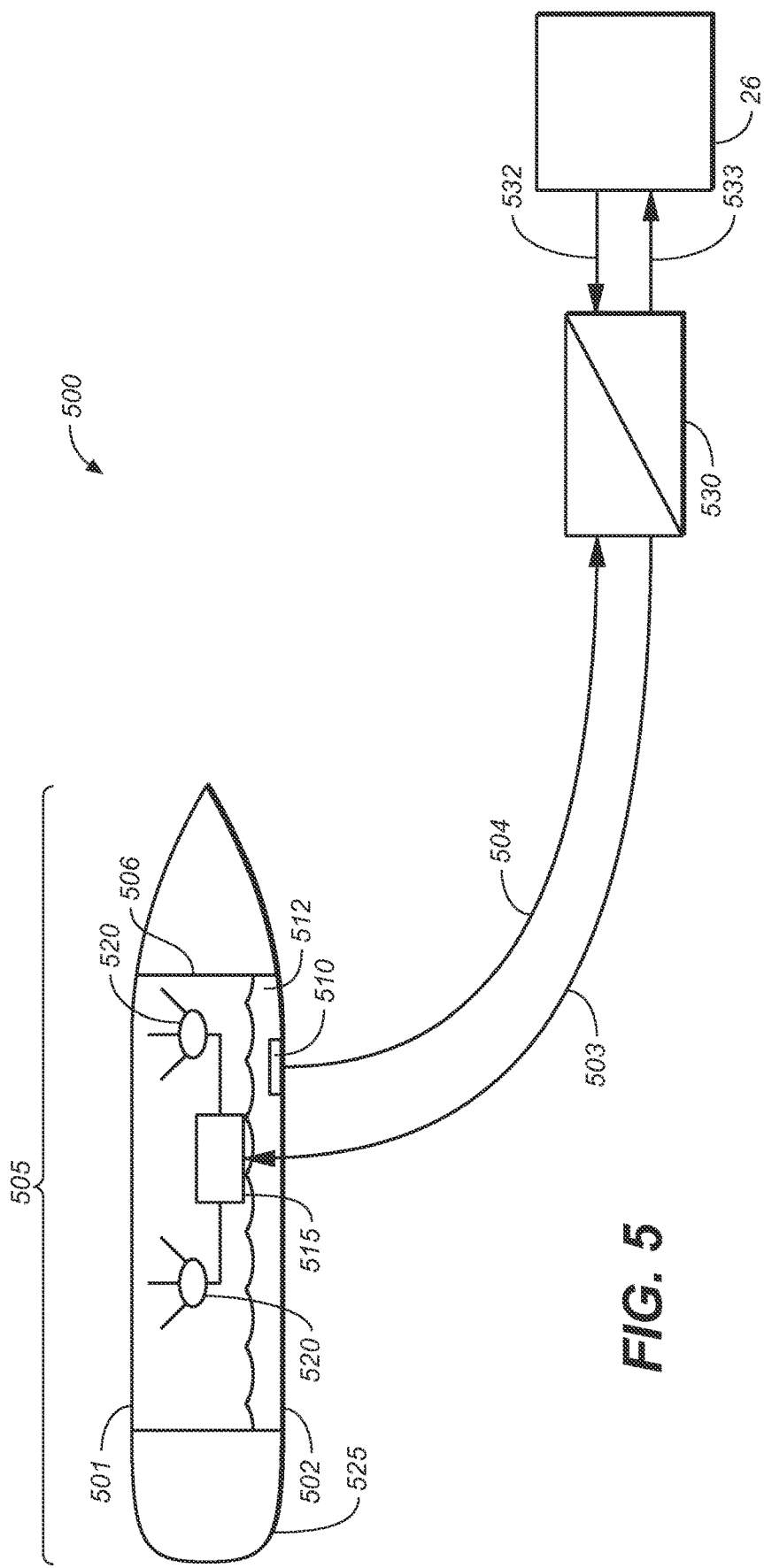
FIG. 5 is a schematic diagram of a fuel tank heat dissipation system for FC cooling, in accordance with an embodiment.

Referring now to FIG. 5, a schematic diagram 500 of a fuel tank heat dissipation system for FC cooling is shown in accordance with an embodiment. In one embodiment, schematic diagram 500 includes a fuel tank 506, a filter 510, a pump 515, at least one nozzle 520, a heat exchanger 530, and FC 26.

For example, as discussed herein, integrated hydrogen-electric engine system 1 includes an energy core in the form of a fuel cell stack 26 such as, for example, a PEMFC. As described herein, the fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26.

In one embodiment, integrated hydrogen-electric engine system 1 may include any number of external radiators 19 (FIG. 1) for facilitating air flow and adding, for instance, additional cooling. Notably, fuel cell stack 26 can include liquid cooled and/or air cooled cell types that so that cooling loads are integrated into heat exchanger 24 for reducing total amount of external radiators needed in the system.

Additionally, and/or alternatively, motor assembly 28 can be coupled with heat exchanger 24 for looping in the cooling/heating loops from motor assembly 28 as necessary. Such heating/cooling control can be managed, for instance, via controller 200 of integrated hydrogen-electric engine system 1. In embodiments, fuel source 20 can be disposed in fluid communication with motor assembly 28 or any other suitable component to facilitate cooling of such components.

In embodiments, motors 30 and inverters 29 can be coupled together and positioned to share the same thermal interface so a motor casing of the motors 30 is also an inverter heat sink such that a single cooling loop goes through motor assembly 28 for cooling the inverters 29 and the motors 30 at the same time.

With reference again to FIG. 5, in one embodiment, fuel tank 506 is a rigid or bladder (either possibly removable) fuel tank installed within a compartment designed to hold the fuel tank 506. In one embodiment, fuel tank 506 is a tank that forms part of the aircraft external structure. In one embodiment, fuel tank 506 is an integral fuel tank which forms part of aircraft structure, e.g., the wing and has a leading edge section 525 attached to the front of the fuel tank 506. In one embodiment, fuel tank 506 is a conformal fuel tank. In one embodiment, an aircraft may include a plurality of fuel tanks 506. In one embodiment, fuel tank 506 is an auxiliary fuel tank externally carried by an aircraft (e.g., a drop tank).

In one embodiment, fuel tank 506 may be located in a part of an aircraft component such as one or more of, a wing, an empennage (e.g., an auxiliary tank), horizontal stabilizer, surge tank, and the like. Although, in different embodiments, the fuel tank 506 may be located in different areas or in different aircraft components, for purposes of clarity, the following discussion utilizes an embodiment where the wing 505 is the component containing the fuel tank 506.

In one embodiment, there may be one or more fuel tanks 506 located in each of the wings of the aircraft. In one embodiment, the fuel tanks located in each of the wings may be fluidly coupled such that if more fluid is located in one wing fuel tank than another, it will be manually, mechanically, or otherwise moved until the fluid levels in the wing fuel tanks are balanced. In one embodiment, the fuel tanks located in each of the wings are not fluidly coupled. In one embodiment, the balancing of the fluid levels in the different wing tanks may be controlled by controller 200.

In one embodiment, fuel tank 506 has a plurality of surfaces such as, but not limited to, an upper surface 501 and a lower surface 502. In one embodiment, the upper surface 501 is a surface where anything applied to the interior thereof would be in competition with gravity while the lower surface 502 is a surface where anything applied to the interior thereof would be held there by gravity. That is, the force of gravity (in most aspects of motion and/or flight) would be providing a downward force that would be constantly attempting to remove anything sprayed or otherwise located on the interior of upper surface 501 and pulling it down to the interior of lower surface 502.

In one embodiment, filter 510, pump 515, and at least one nozzle 520 are located within the fuel tank 506. In one embodiment, such as in aircraft with integral fuel tank(s), there is good thermal conductance between liquids inside and air outside. In one embodiment, there may be a need to remove, bridge, or reduce any thermal insulation between the fuel tank 506 and the wing 505 surface. In one embodiment, a thermally-conductive coating may be applied to the interior of fuel tank 506 to increase the heat radiative capability of fuel tank 506.

In one embodiment, nozzle 520 is a fan-shaped sprayers to provide a wide area of coverage of the fluid being sprayed. In one embodiment, when a plurality of fan-shaped sprayer type nozzles 520 are used, the overlapping spray patterns provide coverage to most (or all) of upper surface 501 of fuel tank 506. In one embodiment, after the fluid is sprayed toward the upper surface 501, some of the fluid will fall and/or runs down the side walls of fuel tank 506 and to the lower surface 502 (such as due to gravity, etc.). In so doing, the fluid will flow to each of the different walls due to surface tension thereby ensuring maximal coverage of the fluid on the interior walls of fuel tank 506. In some embodiments, fuel tank 506 is shaped with a curved surface wherein substantially all of the curved surface has a bend radius less than that required for fluid to adhere due to surface tension at operational flow rates of the fluid. In one embodiment, heated fluid 512 is chosen for its dispersion properties such that surface tension is sufficient for it to coat the substantially all of the upper surface 501 given the geometry of any given fuel tank.

In one embodiment, since the exterior upper surface 501 and 502 of fuel tank 506 are exposed to the airflow, those surfaces will act as the heat exchangers which are already subject to a large volume of airflow and as such, will not require any additional components that would cause additional drag. In other words, embodiments described herein provide a thermal transfer to ambient air through wing skin, where the thermal transfer is naturally enhanced with forward airspeed.

Figure 6:
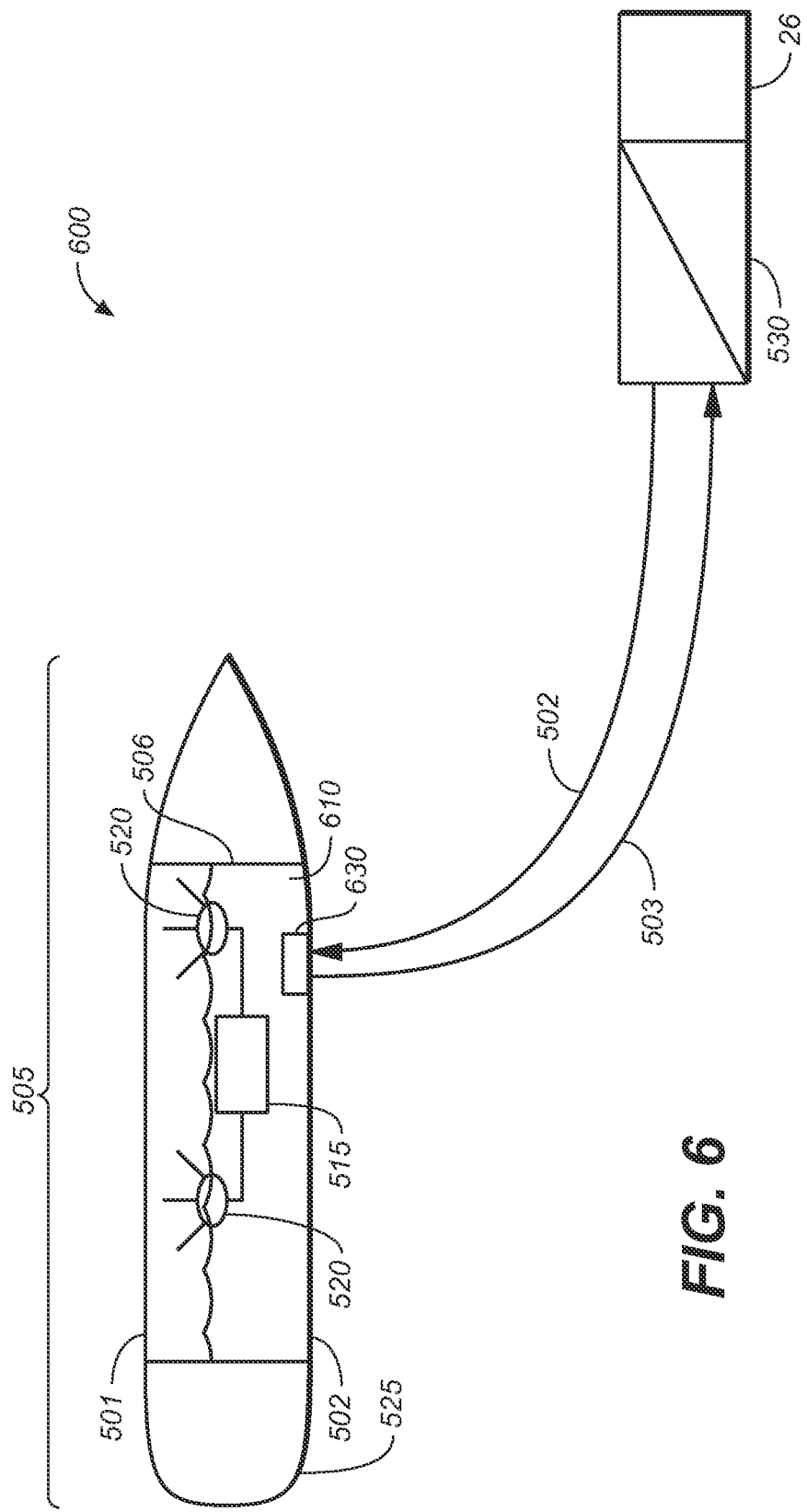
FIG. 6 is a schematic diagram of another fuel tank heat dissipation system for FC cooling, in accordance with an embodiment.

In one embodiment, filter 510 is an ion trap, e.g., a pass-through filter or the like. In one embodiment, instead of (or in addition to) a filter 510 (such as shown in FIG. 6), microparticles may be suspended in the fluid to act as filters.

In operation, the waste heat is generated by the operation of FC 26.

In one embodiment, as described herein, an FC 26 coolant such as a non-conductive liquid or gaseous coolant, e.g. helium, hydrogen gas, or the like) which has high thermal conductivity is used about the FC 26. In one embodiment, the FC 26 coolant takes the waste heat from FC 26 and transfers it to an intermediary heat exchanger 530. In one embodiment, the hot FC 26 coolant travels along exit path 532 to intermediary heat exchanger 530 and after it has cooled it returns to FC 26 via return path 533.

In one embodiment, the intermediary heat exchanger 530 is a liquid-liquid heat exchanger. In one embodiment, intermediary heat exchanger 530 is operationally coupled with both the FC 26 coolant and the fluid used by the fuel tank heat dissipating system. However, in operation, intermediary heat exchanger 530 allows the transfer of heat from the FC 26 coolant to the fluid used by the fuel tank heat dissipating system, while electrically isolating the FC 26 coolant from the fluid used by the fuel tank heat dissipating system.

In other words, the intermediary heat exchanger 530 allows the FC 26 coolant to remain in a closed loop and therefore maintain low electrical conductivity of the FC 26 coolant and prevent and/or remediate ions leached into the FC 26 coolant as sulfur and hydrocarbons can poison the catalyst of the fuel cell.

In one embodiment, the heated fluid 512 used by the fuel tank heat dissipating system leaves the intermediary heat exchanger 530 along pathway 503, and the cooled fluid used by the fuel tank heat dissipating system returns to intermediary heat exchanger 530 along pathway 504. In one embodiment, the pump 515 and/or other pumps used to move the fluid between the fuel tank 506 and the intermediary heat exchanger 530 are existing fuel pumps that were initially used to move the fuel within and/or between the aircraft's fuel tanks.

In one embodiment, the fluid used by the fuel tank heat dissipating system to transfer the waste heat from the intermediary heat exchanger 530 to the fuel tank 506 surfaces is a hydrocarbon fuel that is compatible with the existing fuel tank 506, e.g., such as gasoline, diesel, kerosene, JetA, or the like. In one embodiment, a hydrocarbon fuel is used for which the fuel tank 506 is already certified.

In one embodiment, the fluid used by the fuel tank heat dissipating system to transfer the waste heat from the intermediary heat exchanger 530 to the fuel tank 506 surfaces is a coolant such as, but not limited to, an approximately 50/50 Glycol-water mixture with deionizing agents (to reduce conductivity). In one embodiment, the fluid used by the fuel tank heat dissipating system includes dispersed microparticle ion traps (e.g. Glysantin, Dylanene FC, or the like). In one embodiment, the fluid used by the fuel tank heat dissipating system is pumped through deionizing columns (e.g., Toyota FC Stack Coolant pin 08889-01502 used in Mirai fuel cell car, or the like).

As discussed herein, in one embodiment, the fluid used by the fuel tank heat dissipating system need not be clean, while the FC 26 coolant should essentially be kept clean and ion-free, with low-conductivity. Thus, the embodiments described herein provides such a system.

Although shown in certain locations in FIG. 5 in accordance with one embodiment, in other embodiments, one, some, or all of the components shown in FIG. 5 could be located in other locations. For example, one, some, or all of the components could be located on the sides of components, coupled with or located in different locations on the airframe, and the like. Moreover, although shown as being separate components, one or more of the different components could be a single component, or broken down into a number of components. Thus, the breakdown and locations of components as shown in FIG. 5 is indicative of one embodiment, which is provided for purposes of clarity and it should be appreciated that in other embodiments, the groupings, arrangement, and/or locations of the components may be different than shown in the embodiment of FIG. 5.

With reference now to FIG. 6, a schematic diagram 600 of another fuel tank heat dissipation system for FC cooling is shown in accordance with an embodiment.

For purposes of clarity, a discussion of the components that were visible and/or described in FIG. 5 will not be repeated herein, but are incorporated by the discussion of FIG. 5 in their entirety.

In one embodiment as shown in FIG. 6, instead of having the hot FC 26 coolant travel along exit path 532 to intermediary heat exchanger 530 and return to FC 26 via return path 533 after it has cooled, the intermediary heat exchanger 530 is coupled with (or about) a portion of FC 26 containing the FC 26 coolant. For example, in one embodiment, the intermediary heat exchanger 530 is coupled with (or about) a portion of a radiator or other heat sink feature. As such, the FC 26 coolant will move the waste heat generated by FC 26 to the heat sink which is thermally coupled with intermediary heat exchanger 530. Intermediary heat exchanger 530 will then provide the waste heat to the fluid used by the fuel tank heat dissipating system where it will be transferred from the intermediary heat exchanger 530 to the fuel tank 506 surfaces as described in FIG. 5. In another embodiment, FC heat exchanger 530 comprising coolant channels within FC 26 are fluidically coupled with coolant paths 503, 504 such that the FC heat exchanger 530 and the fuel tank heat exchanger 630 make a loop, without an intermediary heat exchanger.

In one embodiment, fuel tank 506 includes a heat exchanger 630 submerged in the fluid 610. In one embodiment, heat exchanger 630 receives heated coolant from intermediary FC heat exchanger 530 via pathway 503 and transfers heat to the fluid 610. In one embodiment, pump 515 will spray the fluid 610 onto the upper surface 501 as described herein.

In one embodiment, heat exchanger 630 will then return the coolant along fluid path 503 to the FC heat exchanger 530.

Although two changes to the schematic 500 are shown in schematic 600, it should be appreciated that in different embodiments, only one of the two changes may be used. In another embodiment, both changes may be utilized.

Although shown in certain locations in FIG. 6 in accordance with one embodiment, in other embodiments, one, some, or all of the components shown in FIG. 6 could be located in other locations. For example, one, some, or all of the components could be located on the sides of components, coupled with or located in different locations on the airframe, and the like. Moreover, although shown as being separate components, one or more of the different components could be a single component, or broken down into a number of components. Thus, the breakdown and locations of components as shown in FIG. 6 is indicative of one embodiment, which is provided for purposes of clarity and it should be appreciated that in other embodiments, the groupings, arrangement, and/or locations of the components may be different than shown in the embodiment of FIG. 6.

Figure 7:
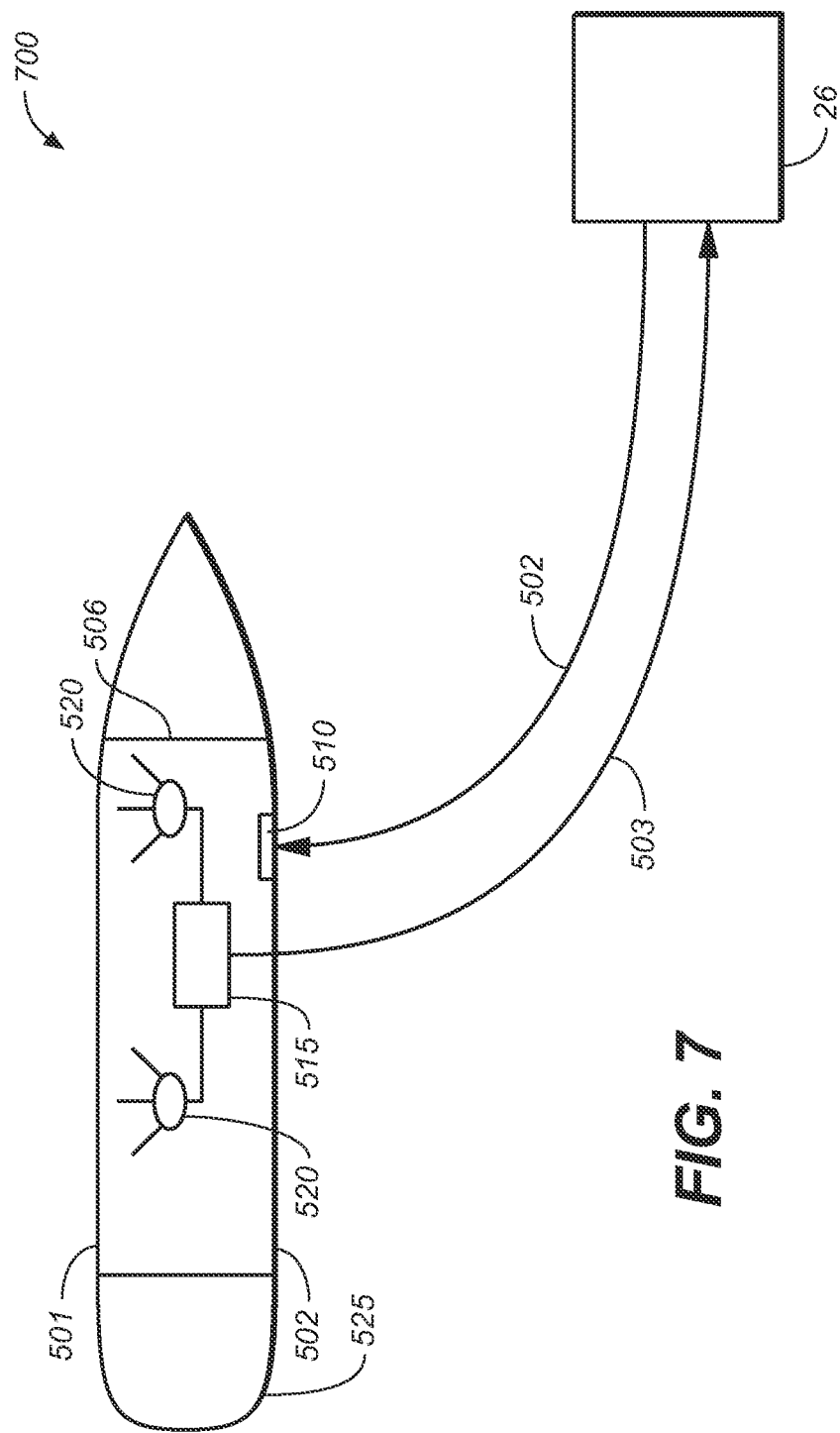
FIG. 7 is a schematic diagram of yet another fuel tank heat dissipation system for FC cooling, in accordance with an embodiment.

Referring now to FIG. 7, a schematic diagram 700 of yet another fuel tank heat dissipation system for FC cooling is shown in accordance with an embodiment.

For purposes of clarity, a discussion of the components that were visible and/or described in FIGS. 5 and 6 will not be repeated herein, but are incorporated by the discussion of FIGS. 5 and 6 in their entirety.

In one embodiment as shown in FIG. 7, instead of utilizing two fluids, only a single fluid is used. For example, in one embodiment, instead of having FC 26 coolant, the intermediary heat exchanger 530 is coupled with (or about) a heat sink portion of FC 26. In one embodiment, the waste heat generated by FC 26 will be provided to the heat sink portion of FC 26 which is thermally coupled with intermediary heat exchanger 530. Intermediary heat exchanger 530 will then provide the waste heat from the heat sink portion of FC 26 to the fluid used by the fuel tank heat dissipating system such that the waste heat will be transferred from the intermediary heat exchanger 530 to the fuel tank 506 surfaces as described in FIG. 5. In so doing, the FC 26 can be cooled without requiring two cooling fluids.

Although shown in certain locations in FIG. 7 in accordance with one embodiment, in other embodiments, one, some, or all of the components shown in FIG. 7 could be located in other locations. For example, one, some, or all of the components could be located on the sides of components, coupled with or located in different locations on the airframe, and the like. Moreover, although shown as being separate components, one or more of the different components could be a single component, or broken down into a number of components. Thus, the breakdown and locations of components as shown in FIG. 7 is indicative of one embodiment, which is provided for purposes of clarity and it should be appreciated that in other embodiments, the groupings, arrangement, and/or locations of the components may be different than shown in the embodiment of FIG. 7.

In one embodiment, the heat that is being radiated by the wing or other fuel tank surface(s) may be used for de-icing of the surfaces, such as wings and the like during flight.

A problem that may have prevented use of fuel tank heat dissipation is that a sufficiently-hot wing may disrupt the boundary layer, causing drag. In one embodiment, this is prevented or resolved by using lower-temperature (LT) PEMFCs. In one embodiment, this is prevented by ensuring a large enough area is being covered by the spray of the fluid, such that surface temperatures on the wing 505 remain closer to the ambient temperature.

In one embodiment, controller 200, or the like, will monitor surface temperatures for control feedback (bypass to alternate coolers, e.g. ram air heat exchangers) or error detection (potentially indicating "land immediately") via input received from one or more sensors, such as when said surface temperature exceeds one or more temperature thresholds. In one embodiment, the one or more sensors may be embedded thermocouples in the tank 506 and/or wing 505 surface. In one embodiment, the one or more sensors may be heat visualizing sensors such as an IR camera, thermal scope, or the like. In one embodiment, the heat visualizing sensors are located inside fuel tank 506. In one embodiment, the heat visualizing sensors are located outside fuel tank 506 but inside wing 505. In one embodiment, the heat visualizing sensors are located outside of both fuel tank 506 and wing 505.

In one embodiment, by monitoring the surface temperatures, the information obtained can be used to minimize the pump power needed to transfer the required amount of heat. For example, as the system obtains a sufficient temperature difference between the hot fluid leaving the intermediate heat exchanger and the cooler fluid returning to the intermediate heat exchanger, the temperature difference will begin to cause its own circular flow such that the power needed by the pump to move the fluid can be reduced without reducing the range of the spray generated by the pump.

As can be appreciated, securement of any of the components of the disclosed systems can be effectuated using known securement techniques such welding, crimping, gluing, fastening, etc.

The phrases "in one embodiment," "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Embodiments of the present disclosure may include one, some, or all of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the Figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A fuel tank heat dissipation system for fuel cell (FC) cooling comprising:
    at least one FC;
    a heat exchanger in thermal communication with said at least one fuel cell;
    a fuel tank in fluid communication with said heat exchanger;
    a fluid to receive heat from said heat exchanger and flow along a first fluid path to said fuel tank;
    a nozzle to spray said fluid about an interior surface of said fuel tank, where said spray of said fluid about said interior of said fuel tank dissipates said heat of the fluid;
    a second fluid path from said fuel tank to said heat exchanger, said second fluid path to return said fluid that has dissipated said heat to said heat exchanger; and
    an FC coolant to cool said at least one FC, said FC coolant different than said fluid, said FC coolant flowing in a closed loop between said at least one FC and the heat exchanger such that said FC coolant does not mix with said fluid at said heat exchanger.

2. The fuel tank heat dissipation system of claim 1, wherein said nozzle is a fan-shaped sprayer that provides a wide area of coverage of said fluid being sprayed.

3. The fuel tank heat dissipation system of claim 1, further comprising:
    a plurality of nozzles to spray said fluid about said interior surface of said fuel tank.

4. The fuel tank heat dissipation system of claim 1, wherein said nozzle sprays said fluid about an upper surface of said interior surface of said fuel tank.

5. The fuel tank heat dissipation system of claim 4, further comprising:
    a plurality of nozzles to spray said fluid about said an upper surface of said interior surface of said fuel tank of said fuel tank in an overlapping spay pattern.

6. The fuel tank heat dissipation system of claim 1, further comprising:
    a thermally-conductive coating applied to said interior surface of said fuel tank.

7. The fuel tank heat dissipation system of claim 1, further comprising:
    an ion trap comprising microparticles suspended in said fluid.

8. The fuel tank heat dissipation system of claim 1, further comprising:
    an ion trap comprising a pass through filter.

9. The fuel tank heat dissipation system of claim 1, wherein said fluid is a hydrocarbon fuel.

10. The fuel tank heat dissipation system of claim 1, wherein said FC is electrically isolated from said fuel tank.

11. The fuel tank heat dissipation system of claim 1, further comprising:
    at least one sensor to monitor a surface temperature of said fuel tank.

12. The fuel tank heat dissipation system of claim 11, further comprising:
    a controller to receive data about said surface temperature of said fuel tank from said at least one sensor, said controller to provide a control feedback when said surface temperature of said fuel tank exceeds a threshold.

13. The fuel tank heat dissipation system of claim 1, wherein the fuel tank is a repurposed aircraft fuel tank originally used to store aircraft fuel.

14. The fuel tank heat dissipation system of claim 13, wherein the fuel tank is a conformal fuel tank.

15. The fuel tank heat dissipation system of claim 1, further comprising:
    an internal heat exchanger inside the fuel tank that receives said fluid from said first fluid path,
    wherein said fluid that has dissipated said heat collects in said fuel tank and submerges said internal heat exchanger.

16. The fuel tank heat dissipation system of claim 11, wherein the sensor is disposed externally to the fuel tank.

17. The fuel tank heat dissipation system of claim 16, wherein the sensor is an infrared camera.

* * * * *